(12) United States Patent
Han et al.

(10) Patent No.: US 8,580,160 B2
(45) Date of Patent: Nov. 12, 2013

(54) ALGAE OIL BASED DIELECTRIC FLUID FOR ELECTRICAL COMPONENTS

(75) Inventors: Suh Joon Han, Belle Mead, NJ (US);
Dirk B. Zinkweg, Flemington, NJ (US);
Jeffrey M. Cogen, Flemington, NJ (US);
Steve Gluck, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 209 days.

(21) Appl. No.: 12/977,324

(22) Filed: Dec. 23, 2010

(65) Prior Publication Data

US 2011/0188202 A1 Aug. 4, 2011

Related U.S. Application Data

(60) Provisional application No. 61/290,315, filed on Dec. 28, 2009.

(51) Int. Cl.
*C09K 5/00* (2006.01)
(52) U.S. Cl.
USPC .................... 252/570; 252/571; 252/572

(58) Field of Classification Search
None
See application file for complete search history.

(56) References Cited

U.S. PATENT DOCUMENTS

| 6,280,659 B1 | 8/2001 | Sundin |
| 6,645,404 B2 | 11/2003 | Dommen et al. |
| 6,726,857 B2 | 4/2004 | Goedde et al. |
| 2005/0040375 A1 | 2/2005 | Corkran et al. |
| 2005/0072964 A1 | 4/2005 | Rapp et al. |
| 2010/0120643 A1* | 5/2010 | Brown et al. .............. 508/496 |

FOREIGN PATENT DOCUMENTS

| AU | 2009201376 A1 | 10/2009 |
| EP | 1304704 A2 | 4/2003 |
| EP | 2128873 A1 | 12/2009 |
| EP | 2128874 A1 | 12/2009 |

* cited by examiner

*Primary Examiner* — Necholus Ogden, Jr.
(74) *Attorney, Agent, or Firm* — Whyte Hirschboeck Dudek S.C.

(57) ABSTRACT

The disclosure is directed to a dielectric fluid. The dielectric fluid includes an algae oil. The algae oil includes a natural algae antioxidant. The natural algae antioxidant is selected from β-carotene, astaxanthin, tocopherol, polyunsaturated triglycerides, and combinations thereof.

19 Claims, No Drawings

ALGAE OIL BASED DIELECTRIC FLUID FOR ELECTRICAL COMPONENTS

CROSS REFERENCE TO RELATED APPLICATION

This application claims priority to U.S. patent application No. 61/290,315 filed on Dec. 28, 2009, the entire content of which is incorporated by reference herein.

BACKGROUND

Dielectrics are non-conducting fluids used in a variety of applications. The insulative and cooling properties of dielectric fluids find use in transformers, capacitors, switching gears, transmission components, distribution components, switches, regulators, circuit breakers, autoreclosers, and other electrical apparatus and electrical components.

In a transformer, the dielectric fluid provides coolant and insulative properties to the internal transformer components. The dielectric fluid cools the transformer and also provides part of the electrical insulation between internal live parts. A requirement for dielectric fluid is a long operating life (10-20 years) and stability at high temperatures for an extended period.

Polychlorinated biphenyl compounds (also known as "PCB's"), once used as dielectric fluid in transformers, have been phased out due to their toxic properties and negative environmental impact. Non-toxic transformer oils that have replaced PCB's include silicone-based or fluorinated hydrocarbons oils, mineral oil, fatty acid esters, vegetable-based oils and vegetable seed oils. These non-toxic oils have drawbacks regarding viscosity, flash point, fire point, pour point, water saturation point, dielectric strength and/or other properties limiting their usefulness as dielectric fluids.

Consequently, a need exists for a non-toxic, biodegradable, PCB-free dielectric fluid for electrical components that have the same, or substantially the same, chemical, mechanical, and/or physical properties as PCB-based dielectric fluid.

SUMMARY

The present disclosure is directed to dielectric fluid compositions composed of algae oil and/or microbial oil for use in transformers, switching gears, electrical cables, electric generation, transmission, and distribution power equipment.

The disclosure provides a dielectric fluid. In an embodiment, a dielectric fluid is provided and includes an algae oil. The algae oil includes a natural algae antioxidant. The natural algae antioxidant is selected from β-carotene, astaxanthin, tocopherol, polyunsaturated triglycerides, and combinations thereof.

The disclosure provides a device. In an embodiment, a device is provided and includes an electrical component and a dielectric fluid in operative communication with the electrical component. The dielectric fluid includes an algae oil.

The disclosure provides a process. In an embodiment, a process is provided and includes placing a dielectric fluid in operative communication with an electrical component. The dielectric fluid includes an algae oil. The process further includes cooling the electrical component with the dielectric fluid.

The disclosure provides another process. In an embodiment, a process is provided and includes placing a dielectric fluid in operative communication with an electrical component. The dielectric fluid includes an algae oil. The process further includes insulating the electrical component with the dielectric fluid.

An advantage of the present disclosure is an improved dielectric fluid.

An advantage of the present disclosure is an environmentally-friendly dielectric fluid composed of algae oil.

DETAILED DESCRIPTION

The present disclosure is directed to a dielectric fluid. The dielectric fluids provided herein are suitable for use with an electrical component and transformers in particular.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent U.S. version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, flash point, viscosity, dielectric strength, percent weight, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts for components in the fluid and/or composition, additives, and various other components in the composition, and the various characteristics and properties by which these components are defined.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

"Acidity" is measured by titrating a known volume of oil with a solution of alcoholic KOH to the neutralization point. The weight of the oil in grams per mg KOH is referred to interchangeably as the acidity number or the neutralization number. The acidity is determined using ASTM test method D 974.

"Antioxidant" is a molecule capable of slowing or preventing the oxidation of other molecules.

"Blend," "fluid blend" and like terms is a blend of two or more fluids, as well as blends of fluids with various additives. Such a blend may or may not be miscible. Such a blend may or may not be phase separated. Such a blend may or may not contain one or more domain configurations, as determined from light scattering, and any other method known in the art.

"Composition" and like terms is a mixture or blend of two or more components.

"Dielectric breakdown voltage" is a measure of the liquid's ability to withstand electric stress without failure. The dielectric breakdown voltage serves to indicate the presence of contaminating agents such as water, dirt, cellulosic fibers, or conducting particles in the liquid, one or more of which may be present in significant concentrations when low breakdown voltages are obtained. However, a high dielectric breakdown voltage does not necessarily indicate the absence of all contaminants; it may merely indicate that the concentrations of contaminants that are present in the liquid between the electrodes are not large enough to deleteriously affect the average breakdown voltage of the liquid. Dielectric breakdown voltage is measured in accordance with ASTM D 1816.

"Dielectric fluid" is a non-conducting fluid having a dielectric breakdown greater than 20 kV as measured in accordance with ASTM D 1816 (VDE electrodes, 1 mm gap) and/or a dissipation factor of less than 0.2% as measured in accordance with ASTM D 924 (60 Hz, 25° C.), and less than 4 at 100° C. (ASTM D 924, 60 Hz). A dielectric fluid provides coolant and/or insulative properties when placed in operative communication with an electrical component.

"Dielectric Strength" or "dielectric breakdown" (in MV/m or kV/mm) is the maximum electric field strength that a dielectric fluid can withstand intrinsically without breaking down. The dielectric strength is measured by taking 100-150 ml oil sample in a test cell and applying a voltage between test electrodes separated by a specified gap. The breakdown voltage is noted in volts per millimeter. The test is preferably run five times and the average value is calculated. The dielectric strength is determined using ASTM D 1816 or ASTM D 877.

"Dissipation factor" is a measure of the electrical loss due to conducting species and is tested by measuring the capacitance of fluids in a test cell using a capacitance bridge. The dissipation factor is determined using ASTM D 924.

"Electrical conductivity" is measured using a conductivity meter such as an Emcee meter. The electrical conductivity is determined in accordance with ASTM D 2624.

"Flash point" is the temperature of the fluid that will result in an ignition of the fluid's vapors when exposed to air and an ignition source. The flash point is determined by placing a fluid sample in a flashpoint tester and determining the temperature at which it ignites in accordance with ASTM D 92.

"Fire point" is the temperature of the fluid at which sustained combustion occurs when exposed to air and an ignition source. Fire point is determined in accordance with ASTM D 92.

"Oxidation" is a chemical reaction that transfers electrons from a substance to an oxidizing agent. Oxidation reactions can produce reactive free radicals, which can degrade a composition. Antioxidants can terminate free radicals.

"Pour point" is the lowest temperature at which a liquid will pour or flow under prescribed conditions. The pour point is determined by cooling an oil sample with dry ice/acetone and determining the temperature at which the liquid becomes a semi-solid. The pour point is determined using ASTM D 97.

"Viscosity" is the measurement of the resistance of a fluid to flow. Viscosity is measured in accordance with ASTM D 445, Brookfield-Viscosimeter.

"Water saturation point" is the percentage of saturation of water in the dielectric fluid. The water saturation point is a function of the temperature and chemical structure of the dielectric fluid. As the water saturation point increases, the dielectric strength generally decreases. Water saturation point is determined in accordance with ASTM D 1533.

The present disclosure provides a dielectric fluid. The dielectric fluid includes an algae oil and/or a microbial oil.

The term "algae oil," as used herein is an oil derived from algae. The term "algae," as used herein, is any autotrophic organism capable of photosynthesis that lives in water (either freshwater and/or seawater). The term "algae" includes diatoms (Bacillariophyceae), green algae (Chlorophyceae), blue-green algae (Cyanophyceae), golden algae (Chrysophyceae), brown algae, and/or red algae. The algae can be any algae species including macro algae, micro algae, marine algae, or freshwater algae. Nonlimiting examples of suitable algae include chiarella vulgaris, haematococcus, stichochoccus, bacillariophyta (golden algae), cyanophyceae (blue green algae), chlorophytes (green algae), chlorella, botryococcus braunii, cyanobacteria, prymnesiophytes, coccolithophorads, neochloris oleoabundans, scenedesmus dimorphus, atelopus dimorphus, euglena gracilis, dunalielia, dunaliella salina, dunaliella tertiolecta, diatoms, bacillariophyta, chlorophyceae, phaeodactylum tricornutunum, stigmatophytes, dictyochophytes, and pelagophytes. The algae may be single cells, colonies, clumps, filamentous and any combination thereof.

Algae is an efficient biological factory capable of taking a waste form of carbon (such as $CO_2$) and converting it into a high density liquid form of energy (natural oil). Algae is composed of carbohydrates, protein, and natural oils. Algae can produce up to 60% (or more) of their body weight in the form of natural oil, such as triglycerides. A "triglyceride" is a glycerol backbone linked to three fatty acid molecules. Nonlimiting procedures suitable to extract triglycerides from algae include expeller/press, solvent extraction, supercritical fluid extraction, enzymatic extraction, osmotic shock, electromechanical extraction, and any combination of the foregoing.

Algae oil is a mixture of unsaturated/saturated triglycerides of fatty acids. The fatty acids have a carbon chain ranging from 8 to 22 carbon atoms. If the carbon chain has no double bonds, it is a saturated oil, and is designated Cn:0 where n is the number of carbon atoms. Chains with one double bond are monounsaturated and are designated Cn:1; with two double bonds, it will be Cn:2 and with three double bonds Cn:3. For example, oleic acid is a C18:1 fatty acid while erucic acid is a C22:1 fatty acid. The algae may be genetically modified or otherwise selected to produce algae oil with a high content of mono unsaturated triglycerides or a low content of polyunsaturated triglycerides. Similarly, the algae oil may be partially or fully hydrogenated or otherwise processed to increase the saturation of the triglycerides or functionalized with chemical groups. For example, genetically-modified algae and/or post-extraction algae oil hydrogenation may produce algae oil composed of triglycerides with greater than 20 wt % to 90 wt % oleic acid (C18:1).

In an embodiment, the algae oil includes greater than 30 wt %, or greater than 50 wt %, or greater than 70 wt % oleic acid (C18:1). It is understood that algae oil is not a seed oil, or a vegetable oil. Algae oil is advantageous over vegetable oil as algae oil can be tailored via genetic hybridization much quicker than a vegetable oil.

Dielectric fluid comprising algae oil is advantageous as algae grows at a much faster rate compared to other sources of natural oils such as vegetables and seeds. By way of example, algae oil productivity may be 10 times to 100 times higher than such vegetable seed-based oils due to the rapid growth rate of algae. Algae oil also may utilize non-arable land for production. Another advantage of algae is that it has very high productivity in terms of oil yield per area land as compared to vegetable oil. Table 1 compares the oil production capacity of algae to various vegetables and seeds.

TABLE 1

Oil Yield Per Acre Land

| Type of Oil | Yield per acre (gallons/acre) |
|---|---|
| Corn | 18 |
| Soybean | 18 |
| Sunflower | 102 |
| Rape Seed | 127 |
| Algae | 1200 |

The dielectric fluid may include a microbial oil alone, or in combination with the algae oil. A "microbial oil," as used herein, is an oil derived from a microbe. The term "microbe" includes prokaryotic organisms, microbes that perform photosynthesis, microalgae cells, yeast, and/or fungus. The microbe may be genetically engineered or selected to express a lipid pathway enzyme. For example, the microbe may be microalgae cell, an oleaginous yeast, or a fungus containing an exogenous gene that encodes a protein selected from a lipase, sucrose transporter, sucrose invertase, fructokinase, polysaccharide-degrading enzyme, a fatty acyl-ACP thioesterase, a fatty acyl-CoA/aldehyde reductase, a fatty acyl-CoA reductase, a fatty aldehyde reductase, a fatty aldehyde decarbonylase, and an acyl carrier protein (ACP). Nonlimiting examples of suitable microbes include microbes from the genus *chromydomonas*, or *chromydomonas reinhardtii*; and *E. coli*.

The algae oil and/or the microbial oil can be functionalized. Nonlimiting examples of suitable functionalizations for the algae oil and/or microbial oil include hydrogenation (full or partial), acetylation, epoxidization, transesterification, and amidization.

In an embodiment, the dielectric fluid includes an algae oil. The algae oil contains a natural algae antioxidant. The algae oil of the present dielectric fluid includes an antioxidant. The antioxidant inhibits oxidation of triglycerides. The antioxidant is a natural algae antioxidant. A "natural algae antioxidant," as used herein, is an antioxidant that is produced by the algae. Nonlimiting examples of natural algae antioxidant include astaxanthin and beta-carotene.

A nonlimiting example of an algae that naturally produces astaxanthin is *Haematococcus pluvialis*, a green microalgae. Astaxanthin accumulates naturally in green algae. By way of example, more than 40 g of astaxanthin per kilo of thy biomass may be obtained from green algae. The microalgae cells may be grown under prescribed conditions (e.g., a green phase, in which the cells are given an abundance of nutrients, and a red phase, in which the cells are deprived of nutrients) which encourage production of high levels of astaxanthin so that their high concentrations of astaxanthin may be harvested with the algae oil. In an embodiment, microalgae may have a concentration of astaxanthin that is 15,000-20,000 ppm and as much as 40,000 ppm of astaxanthin (approx. 10× the concentration present in any other naturally occurring source of astaxanthin).

As compared to other antioxidants, astaxanthin has 100-500 times the antioxidant capacity of Vitamin E. Another natural algae antioxidant is β-carotene (also referred to as "beta-carotene). Beta-carotene has 10 times the antioxidant capacity of Vitamin E. In an embodiment, the dielectric fluid contains from about 0.0001 wt % to about 10 wt % natural algae antioxidant, where the natural algae antioxidant may be any of those described above. Other nonlimiting examples of natural antioxidants include such as alpha-tocopherol, gamma-tocopherol and delta-tocopherol.

In an embodiment, the dielectric fluid includes other antioxidants in addition to the natural algae antioxidant. Nonlimiting examples of suitable antioxidants include alkylated diphenylamines, commercially sold as IRGANOX L-57 available from CIBA SPECIALTY CHEMICALS, Inc. (Tarrytown, N.Y.), a high molecular weight phenolic antioxidant, such as bis(3,5-di-tert-butyl-4-hydroxyhydrocinnamate, or a bis(2,6-di-tert-butylphenol derivative, commercially sold as IRGANOX L-109, also from CIBA SPECIALTY CHEMICALS.

Further nonlimiting examples of additional antioxidants include butylated hydroxy toluene (BHT), butylated hydroxy anisole (BHA), mono-tertiary butyl hydro quinone (TBHQ), and any combination thereof. Oxidation stability tests for dielectric fluid vary based on the use of the dielectric fluid. For example, dielectric fluid for sealed transformer systems, conservators, and free-breathing apparatus each may have a different oxidation stability test. One common test is the oxygen stability index method (AOCS official method Cd 12b-92). In this method, a stream of purified air is passed through a sample of oil, which is held in a thermal bath. The effluent air from the oil sample is then bubbled through a vessel containing deionized water. The conductivity of the water is continuously monitored. Any volatile organic acids from the oil sample are swept by the effluent air. The presence of the volatile organic acids in the effluent air increases the conductivity of water as oxidation proceeds. The oil stability index is defined as the point of maximum change of the rate of oxidation.

Further nonlimiting examples of suitable antioxidants include 2,2-di(4-hydroxyphenyl) propane, phenolthiazine, phenilthizazine carboxylic esters, polymerized trimethyldihydroquinoline, phenyl-α-naphtylamine, N,N'dioctyldiphenylamine, N,N'-diisopropyl-p-phenyldiamine, dibutyl cresol, butylated hydroxyanisoles, anthraquinone, quinoline, pyrocatechol, di-β-naphtyl-para-phenylenediamine, propylgallate, 1,3,5-trimethyl-2,4,6-tris (3,5-di-tert-butyl-4-hydroxybenzyl)benzene, tris(2,4-ditert-butylphenyl)phosphite, bis(1,2,2,6,6-pentamethyl-4-piperidyl)sebacate, tetrakis[methylene(3,5-di-t-butyl-4-hydroxyhydrocinnamate)]methane, thiodiethylene bis(3,5-di-tert-butyl-4-hydroxyhydrocinnamate, 4,4'-thiobis(6-tert-butyl-m-cresol), 2,2'-thiobis(6-t-butyl-4-methylphenol), 2,2'-methylenebis(4-methyl-6-tert-butylphenol), benzenamine, 4-(1-methyl-1-phenylethyl)-N-4[4-(1-methyl-1-phenylethyl) phenyl]-, taxilic acid, citric acid, and any combination of the foregoing.

In an embodiment, the dielectric fluid includes a metal deactivator. Nonlimiting examples of suitable metal deactivators include copper deactivator and aluminum deactivator. Copper has a catalytic effect in the oxidation of oil. The antioxidants react with free oxygen thereby preventing the latter from attacking the oil. A copper deactivator such as benzotriazole derivatives reduce the catalytic activity of copper in the dielectric fluid. In an embodiment, the dielectric fluid contains less than 1 wt % of a copper deactivator. IRGAMET-30 is a commercially available metal deactivator from CIBA SPECIALTY CHEMICALS and is a triazole derivative, N,N-bis(2-Ethylhexyl)-1H-1,2,4-triazole-1 methanamine.

Nonlimiting examples of other suitable metal deactivators include 2',3-bis[[3-[3,5-di-tert-butyl-4-hydroxyphenyl]propionyl]]proponiohydrazine, benzo-triazole fatty amine salt, 1-(di-isooctylaminomethyl)-1,2,4-triazole, 1-(2-methoxyprop-2-yl)tolyltriazole, 1-(1-cyclohexyloxypropyl)tolyltriazole, 1-(1-cyclohexyloxyheptyl)tolyltriazole, 1-(1-cyclohexyloxybutyl)tolyltriazole, 1-[bis(2-ethylhexyl)aminomethyl-4-methylbenzotriazole, triethyl borate, tripropyl borate, triisopropyl borate, tributyl borate, tripentyl borate, trihexyl borate, tricyclohexyl borate, trioctyl borate, triisooctyl borate, and N,N-bis(2-Ethylhexyl)-ar-methyl-1H-benzotriazole-1-methanamine.

Pour point depressants may also be added if low pour points are needed. Commercially available products can be used which are compatible with algae oils. In an embodiment, the dielectric fluid includes 2 wt % or less (based on total weight dielectric fluid) of a pour point depressant which is typically required to bring down the pour point by 10 to 15° C. Nonlimiting examples of suitable pour point depressants include methacrylic acid ester, polyalkyl methacrylate, fatty acid alkyl esters from fatty acids, polyvinyl acetate oligomers, and acrylic oligomers. In an embodiment, the pour point depressant is a polymethacrylate (PMA).

In an embodiment, the pour point may be further reduced by winterizing the dielectric fluid. The dielectric fluid is winterized by lowering the temperature to near or below 0° C. and removing solidified components. The winterization process may be performed as a series of temperature reductions followed by removal of solids at the various temperature. Winterization may be performed by reducing the temperature serially to 5, 0 and −12° C. for several hours, and filtering the solids with diatomaceous earth.

The present algae oil has specific physical properties which makes it suited for use as a dielectric fluid. The dielectric strength of the present dielectric fluid containing algae oil is at least 20 kV/mm (1 mm gap) or at least 35 kV (2.5 mm gap) or at least 40 KV/100 mil (2.5 mm) gap as measured in accordance with ASTM D 1816. The dissipation factor is less than 0.5% at 25° C., less than 0.2%, or less than 0.1% as measured in accordance with ASTM D 924. The acidity is less than 0.06 mg KOH/g, or less than 0.03 mg KOH/g, or less than 0.02 mg KOH/g as measured in accordance with ASTM D 974. The electrical conductivity is less than 1 pS/m at 25° C. or less than 0.25 pS/m as measured in accordance with ASTM D 2624. The flash point is at least 145° C., or at least 200° C., or at least 250° C., or at least 300° C. as measured in accordance with ASTM D 92. The fire point temperature is at least 300° C. as measured in accordance with ASTM D 92. The pour point is less than −10° C., or less than −15° C., or less than −20° C. or less than −40° C. as measured in accordance with ASTM D 97. The water saturation point or the moisture level is reduced (if necessary via vacuum operation or the like) to near 50 ppm. The dielectric fluid has a water content less than 200 ppm as measured in accordance with ASTM D 1533. The dielectric fluid is free, void, or otherwise devoid of PCB. In other words, the amount of PCB (if any) present in the dielectric fluid is not detectible by way of ASTM D 4059.

In an embodiment, the algae oil has a viscosity less than about 50 cSt at 40° C. and less than 15 cSt at 100° C. as measured in accordance with ASTM D 445 (Brookfield).

In an embodiment, the dielectric fluid includes a blend of (i) the algae oil and (ii) a blend component (and optionally a microbial oil). The algae oil may be any algae oil as previously discussed herein. The blend component may be selected from a vegetable oil, a vegetable seed oil, a mineral oil, a silicone fluid, synthetic hydrocarbons, a natural or synthetic ester, poly (α-olefin) and combinations thereof. Nonlimiting examples of suitable vegetable oils include coconut oil, palm oil, wheat germ oil, soya oil, olive oil, corn oil, sunflower oil, safflower oil, hemp oil, and rapeseed/canola oil. Nonlimiting examples of suitable vegetable seed oils include oils extracted from seeds of any of the foregoing vegetables, and also cottonseed oil, sesame oil, bottle gourd oil, buffalo gourd oil, pumpkin seed oil, watermelon seed oil, grape seed oil, blackcurrant seed oil, borage seed oil, carob seed pods, coriander seed oil, flax seed/linseed oil, kapok seed oil, kenaf seed oil, meadowfoam seed oil, okra/hibiscus seed oil, papaya seed oil, perilla seed oil, pequi seed oil, poppy seed oil, ramtil seed oil, royle seed oil, tea seed/camellia oil, and tomato seed oil. Nonlimiting examples of mineral oils include poly-alpha-olefins. Poly (α-olefin)s are derived from the polymerization of α-olefin such as butene (C4), hexene (C6), octene (C8), decence (C10) or dodedence (C12) or more hydrocarbon branched α-olefin. The poly α-olefin) can be a single oligomer and mixture of oligomers of α-olefins. Nonlimiting examples of synthetic esters include polyol esters.

When the dielectric fluid is a blend of the algae oil and the blend component, the dielectric fluid may include from 1 wt % to 99 wt % algae oil and from 99 wt % to greater than 1 wt % blend component, or from 1 wt % to 70 wt % algae oil and from 99 wt % to 30 wt % blend component or from 1 wt % to 50 wt % algae oil and from 99 wt % to 50 wt % blend component or from 1 wt % to 20 wt % algae oil and from 99 wt % to 80 wt % blend component (based on the total weight of the dielectric fluid).

The present dielectric fluid may comprise two or more embodiments disclosed herein.

The present disclosure provides a device. The device includes an electrical component and the present dielectric fluid in operative communication with the electrical component. The present dielectric fluid comprises an algae oil (with natural algae antioxidant) and optionally the blend component as previously disclosed. Nonlimiting examples of suitable electrical components include a transformer, a capacitor, a switching gear, a transmission component, a distribution component, a switch, a regulator, a circuit breaker, an autorecloser, or like components, etc., and/or combinations thereof.

The dielectric fluid is in operative communication with the electrical component. As used herein, "operative communication" is a configuration and/or a spatial relationship enabling the dielectric fluid to cool and/or insulate the electrical component. Operative communication thereby includes direct and/or indirect contact between the dielectric fluid and the electrical component by way of the following configurations: dielectric fluid, in, on, around, adjacent to, contacting, surrounding (wholly or partially) through, and/or in proximity to the electrical component; and the electrical component immersed (wholly or partially) in the dielectric fluid.

In an embodiment, the electrical component is a transformer. A transformer is a device that transfers electrical energy from one circuit to another through inductively coupled conductors—i.e., the transformer's coils. Transformers are classified in terms of power capacity or system voltage, which in turn relates to the application of the transformer in electric power grids. A distribution transformer has a system voltage typically in the range of 36 kV or less. A power transformer has a system voltage typically in the range of 36 kV or greater.

The present dielectric fluid comprising the algae oil is in operative communication with the transformer. In the transformer, the present dielectric fluid provides (1) a liquid coolant that dissipates heat energy generated by the transformer operation and/or (2) an insulator between internal live parts that prevents electrical components from contacting or arcing over the transformer. The dielectric fluid is present in an effective amount to insulate the electrical component. The dielectric fluid also retards the degradation of insulation paper materials. The dielectric fluid is biodegradable and is non-toxic. Biodegradability eases disposal of the present dielectric fluid and eliminates hazards in the event the dielectric fluid is spilled onto the earth or surfaces in the vicinity of the transformer's location.

In an embodiment, the transformer is a distribution transformer. A distribution transformer includes primary and secondary coils or windings in a housing or a tank and a dielectric fluid in the tank in operative communication with the windings. The windings are insulated from each other, via the dielectric fluid, and are wound around a common core of magnetically suitable material, such as iron or steel. The core and/or the windings may also have laminations, insulative coatings or insulation paper materials to further insulate and absorb heat. The core and windings are immersed in the dielectric fluid, allowing free circulation of the fluid. The dielectric fluid covers and surrounds the core and windings. The dielectric fluid completely fills all small voids in the insulation and elsewhere within the housing. The transformer housing provides an air-tight and fluid-tight seal around the tank preventing ingress of air and/or contaminants which may collect and eventually cause failure of the transformer.

In order to improve the rate of heat transfer from the core and coil assembly, the transformer may include additional structures for providing increased cooling, such as fins on the tank that are provided to increase the surface area available to provide cooling, or radiators or tubes attached to the tank that are provided so that the hot fluid that rises to the top of the tank may cool as it circulates through the tubes and returns at the bottom of the tank. These tubes, fins or radiators provide additional cooling surfaces beyond those provided by the tank walls alone. Fans may also be provided to force a current of air to blow across the heated transformer enclosure, or across radiators or tubes to better transfer the heat from the hot dielectric fluid and heated tank to the surrounding air. Also, some transformers include a forced oil cooling system which includes a pump to circulate the dielectric fluid from the bottom of the tank through pipes or radiators to the top of the tank (or from the tank to a separate and remote cooling device and then back to the transformer).

Other embodiments are also possible and are not limited to use in a transformer.

In an embodiment, the present disclosure provides a process that comprises placing a dielectric fluid in operative communication with an electrical component. The dielectric fluid is the present dielectric fluid comprising algae oil and optionally a blend component. The process further includes cooling the electric component with the dielectric fluid. The electrical component may include any one of a transformer, a capacitor, a switching gear, a power cable, a transmission component (such as an oil-filled transmission cable), a distribution component (such as an oil-filled distribution cable), a switch, a regulator, a circuit breaker, an autorecloser, and the like and/or combinations thereof.

In an embodiment, the present disclosure provides a process that comprises placing a dielectric fluid in operative communication with an electrical component. The dielectric fluid is the present dielectric fluid comprising algae oil and optionally a blend component. The algae oil contains a natural algae antioxidant as disclosed above. The process further includes insulating the electric component with the dielectric fluid. The electrical component may include any one of a transformer, a capacitor, a switching gear, a transmission component, a distribution component, a switch, a regulator, a circuit breaker, an autorecloser, and the like and/or combinations thereof.

By way of example, and not by limitation, examples of the present disclosure are provided.

Tables 2A and 2B provide the composition and properties for an algae oil dielectric fluid.

TABLE 2A

| Major Fatty Acids, wt % of oil | Sample 1 |
|---|---|
| C16:0 Palmitic | 8 |
| C16:1 Palmitoleic | 0.5 |
| C18:0 Stearic | 1 |
| C18:1 Oleic | 17 |
| C18:2 Linoleic | 13.7 |
| C18:3 Linolenic | 11.8 |
| Total saturated fat | 10 |
| Total mono-unsaturated fat | 15 |
| Total poly-unsaturated fat | 21.5-22.9 |
| Astaxanthin | 0.1-1.5 |

Wt % based on total weight of the algae oil dielectric fluid.

TABLE 2B

Dielectric fluid performance data of algae dielectric fluid

| Properties | Test Method | Value |
|---|---|---|
| Fire Point, ° C. | ASTM D 92 | 352 |
| Viscosity @ 40° C., cST | ASTM D 924 | 38.34 |
| Viscosity @ 100° C., cST | ASTM D 924 | 8.09 |
| Pour point, ° C. | ASTM D 97 | −21 |
| Neutralization number, mg KOH/g | ASTM D 974 | 0.004 |
| Dielectric strength, 1 mm gap, KV | ASTM D 1816 | 26.1 |
| Power factor at 25° C., % | ASTM D 924 | 0.016 |
| Power factor at 100° C., % | ASTM D 924 | 0.0655 |

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A dielectric fluid comprising:
   an algae oil comprising from 0.0001 wt % to 10 wt % of a natural algae antioxidant which is astaxanthin.

2. The dielectric fluid of claim 1 comprising a microbial oil.

3. The dielectric fluid of claim 1 comprising a blend component selected from the group consisting of a vegetable oil, a vegetable seed oil, a mineral oil, a silicon fluid, a synthetic hydrocarbon, a natural ester, a synthetic ester, α-polyolefin liquid, and combinations thereof.

4. The dielectric fluid of claim 3 comprising from 1 to 50 weight percent algae oil and from 50 to 99 weight percent blend component.

5. The dielectric fluid of claim 1 comprising from about 70 wt % to about 100 wt % percent algae oil.

6. The dielectric fluid of claim 1 comprising from 0.1 wt % to 1.5 wt % astaxanthin.

7. The dielectric fluid of claim 1 comprising a synthetic antioxidant.

8. The dielectric fluid of claim 1 comprising a metal deactivator additive.

9. The dielectric fluid of claim 1 comprising a pour point depressant.

10. A device comprising:
    an electrical component; and
    a dielectric fluid comprising an algae oil in operative communication with the electrical component.

11. The device of claim 10 wherein the electrical component is selected from the group consisting of a transformer, a capacitor, a switching gear, a transmission component, a distribution component, a switch, a regulator, a circuit breaker, an autorecloser, and combinations thereof.

12. The dielectric fluid of claim 1 which is winterized to remove components which solidify at temperatures at or below −12° C.

13. The dielectric fluid of claim 1 which has a dissipation factor of less than 0.5% at 25° C. as measured in accordance with ASTM D 924.

14. The dielectric fluid of claim 1 which has a dissipation factor of less than 0.2% at 25° C. as measured in accordance with ASTM D 924.

15. The dielectric fluid of claim 1 which has a water content of less than 200ppm as measured in accordance with ASTM D 1533.

16. The dielectric fluid of claim 1 which has a viscosity of less than 50 cSt at 40° C.

17. The dielectric fluid of claim 1 which has a viscosity of less than 15 cSt at 100° C.

18. The dielectric fluid of claim 1 comprising 2 wt % or less polymethacrylate.

19. The dielectric fluid of claim 1 comprising greater than 20 wt % unsaturated fatty acids.

\* \* \* \* \*